United States Patent
Robison et al.

(10) Patent No.: US 7,513,057 B2
(45) Date of Patent: Apr. 7, 2009

(54) COMPOUND ANGLE MITER GAUGE

(76) Inventors: Troy Dale Robison, 1580 Palmetto Palm Way, North Port, FL (US) 34288; Troy Anthony Robison, 525 S. Lakeside Ct., Round Lake, IL (US) 60073

(*) Notice: Subject to any disclaimer, the term of this patent is extended or adjusted under 35 U.S.C. 154(b) by 0 days.

(21) Appl. No.: 11/999,868

(22) Filed: Dec. 7, 2007

(65) Prior Publication Data

US 2008/0134531 A1 Jun. 12, 2008

Related U.S. Application Data

(60) Provisional application No. 60/873,483, filed on Dec. 7, 2006.

(51) Int. Cl.
*B43L 7/10* (2006.01)
(52) U.S. Cl. .......................... 33/471; 33/534
(58) Field of Classification Search ................. 33/471, 33/477, 474, 479, 451, 452, 465, 482, 489, 33/562, 27.03, 485, 534, 679.1
See application file for complete search history.

(56) References Cited

U.S. PATENT DOCUMENTS

| | | | | |
|---|---|---|---|---|
| 1,585,563 A * | 5/1926 | Schlattau | ...................... | 33/471 |
| 1,879,980 A * | 9/1932 | Drill | .......................... | 33/455 |
| 2,526,852 A * | 10/1950 | Colton | ........................ | 33/455 |
| 3,650,466 A * | 3/1972 | Talonn | ..................... | 235/61 B |
| 3,855,706 A * | 12/1974 | Price | ......................... | 33/1 SD |
| 4,153,995 A * | 5/1979 | Oertli | .......................... | 33/403 |
| 4,455,750 A * | 6/1984 | Sturz | .............................. | 33/43 |
| 4,625,425 A * | 12/1986 | Senno et al. | ................. | 33/477 |
| 4,736,524 A * | 4/1988 | King | ............................. | 33/451 |
| 5,117,560 A * | 6/1992 | Nevins | ........................ | 33/471 |
| 5,392,525 A * | 2/1995 | Chow | ........................ | 33/465 |
| 5,615,485 A * | 4/1997 | Stoneberg | ................. | 33/27.03 |
| 6,401,584 B1 * | 6/2002 | Rowe | .......................... | 83/829 |
| 6,536,124 B1 * | 3/2003 | Eskew et al. | ................. | 33/471 |
| 6,978,550 B2 * | 12/2005 | Xieh | ......................... | 33/27.02 |
| 7,210,237 B1 * | 5/2007 | Shih | ............................ | 33/471 |
| 7,228,636 B1 * | 6/2007 | Moore | ........................ | 33/417 |
| 7,278,221 B1 | 10/2007 | Shapiro | | |
| 2003/0051358 A1 | 3/2003 | Kruse | | |
| 2004/0107592 A1 * | 6/2004 | Matlis | ......................... | 33/512 |
| 2005/0155234 A1 * | 7/2005 | Xieh | ........................ | 33/27.03 |
| 2006/0005408 A1 * | 1/2006 | Fernand | ...................... | 33/471 |
| 2007/0240321 A1 * | 10/2007 | Shapiro | ....................... | 33/471 |

* cited by examiner

*Primary Examiner*—Yaritza Guadalupe-McCall
(74) *Attorney, Agent, or Firm*—John F. Bryan

(57) ABSTRACT

A crown molding miter gauge has first and second straight edges extending oppositely tangent from circular members wherein one of the circular members includes a Cartesian reference chart reconfigured as a concentric circular chart, fixed with respect to the first straight edge, and the second straight edge is concentrically rotatable, so that the first and second straight edges may be conformed to a wall corner wherein the second straight edge acts as the horizontal reference of the reconfigured Cartesian chart and an indicator, fixed with respect to the second straight edge, acts as the vertical reference of the reconfigured Cartesian chart.

7 Claims, 5 Drawing Sheets

COMPOUND ANGLE MITER GAUGE

This is a nonprovisional application claiming benefit of provisional application 60/873,483, filed on Dec. 7, 2006.

FIELD OF THE INVENTION

The present invention is directed to an adjustable combination square and more particularly, to apparatus for determining compound miter angles as for crown molding used for interior trim in residential or commercial construction

BACKGROUND OF THE INVENTION

The installation of crown molding is probably the most difficult task for an artisan in the building industry. The majority of crown molding is cut on a power miter saw that has compound adjustments for table and bevel cutting angles. Many saws will have marked compound angle settings for 90 degree corners. When cutting anything other than an inside or outside 90 degree corner, the worker has to calculate the compound degree settings, use a specially prepared reference table, or work by trial and error.

There are two types of crown molding used in the building industry with spring angles of 45 degrees and 38 degrees. The "spring angle" is the angle at which the rear face of the crown molding sits between the ceiling and wall. A spring angle of 45 degrees extends out from the wall at an angle of 45 degrees and upward to contact the ceiling. Therefor, the distance from the wall contact of the molding to the ceiling is the same as the distance from the wall to the ceiling contact. With a spring angle of 38 degrees, the rear face of the molding extends out from the wall at an angle of 38 degrees and upwardly to contact the ceiling at a 52 degree angle. Here, the distance from the wall contact of the molding to the ceiling is greater than the distance from the wall to the ceiling contact.

There are two systems for cutting crown molding with a miter saw. Crown molding can be cut by the "stand-up" system", with the molding oriented on the miter saw just as it will be installed against a wall. In this system, the table angle is simply set at the miter angle and there is no adjustment for bevel. Cutting accuracy suffers with the "stand-up" system because it is difficult to hold the molding in the proper orientation. This system is also discouraged for operator safety considerations.

The "flat" system for cutting crown molding, with the molding laid flat on the saw table, involves a compound miter angle. The saw table and bevel are set at calculated values that may be derived by reference to a chart or handbook. This system is the preferred in the building industry for safety and accuracy There are a number of protractors and squares on the market in home centers that provide simple miter angles for trim and moldings. Crown moldings present a different problem. Most products specifically designed for cutting crown molding by the flat system require the user to first determine the angle between the walls at a corner and then, refer to a chart or handbook in order to find the compound settings for their miter saw. This is time consuming and introduces the potential for error. Since errors are only discovered when the pieces are cut and installed, both time and materials can be wasted. Protractor-like measuring tools currently available to the construction industry give the angle between the walls and then require the user to refer to the aforementioned chart.

A first object of the present inventions therefore, is to provide a simple tool for determination of saw table and bevel angle values for installing crown moldings on a wide range of wall corner angles. A second object is to eliminate the need for measuring and transferring corner angles to a chart and perhaps, interpolating between corner angle readings for accurate settings. A third object is to eliminate the potential for wasted time and materials in the installation of crown molding.

SUMMARY OF THE INVENTION

The aforementioned objects are addressed in present invention by providing a tool for matching a corner angle and making a direct reading of the appropriate compound miter angle values. A first circular member having front and rear faces and a tangentially extending straight edge portion is pivotally connected to a similar second circular member at the common center. The straight edge portions are oriented to extend in opposite directions and can be rotated to match against a wall corner angle.

Flat system compound miter values for saw table and bevel angles, differing from prior art reference charts are created as a continuous, non-linear circular scale and imprinted on the rear face of one or both circular members. The circular scale setting values are those appropriate for a selected molding, usually either 38/52 degree or 45/45 degree crown molding. The settings are viewed through a window in the opposite circular member where indicators are located to align with the table and bevel angle values appropriate to the type of molding and corner angle. In this manner, there is no requirement for transferring corner angle readings to a chart and no requirement for interpolation of values for intermediate corner angles.

Stand-up system saw table angles can be added to the circularly imparted miter values, with a separate indicator and the extended straight edges can be marked as rulers for added utility.

When using the gauge of the present invention, the straight edges are first conformed to a corner angle, usually a wall corner, so as to provide the user directly with the saw table and bevel settings for a compound miter cut (usually of a crown molding) to fit that corner. The steps necessary in the use of prior art devices and systems i.e., reading a protractor for the corner angle, transferring the reading to a reference table (possibly by interpolation of intermediate values) and marking or recording the setting values are eliminated. The user simply refers to the gauge and adjusts the saw table and bevel accordingly.

DESCRIPTION OF THE DRAWINGS

The aforementioned and other objects and features of the invention will be apparent from the following detailed description of specific embodiments thereof, when read in conjunction with the accompanying drawings, in which.

DETAILED DESCRIPTION OF THE DRAWINGS

Figure 1:
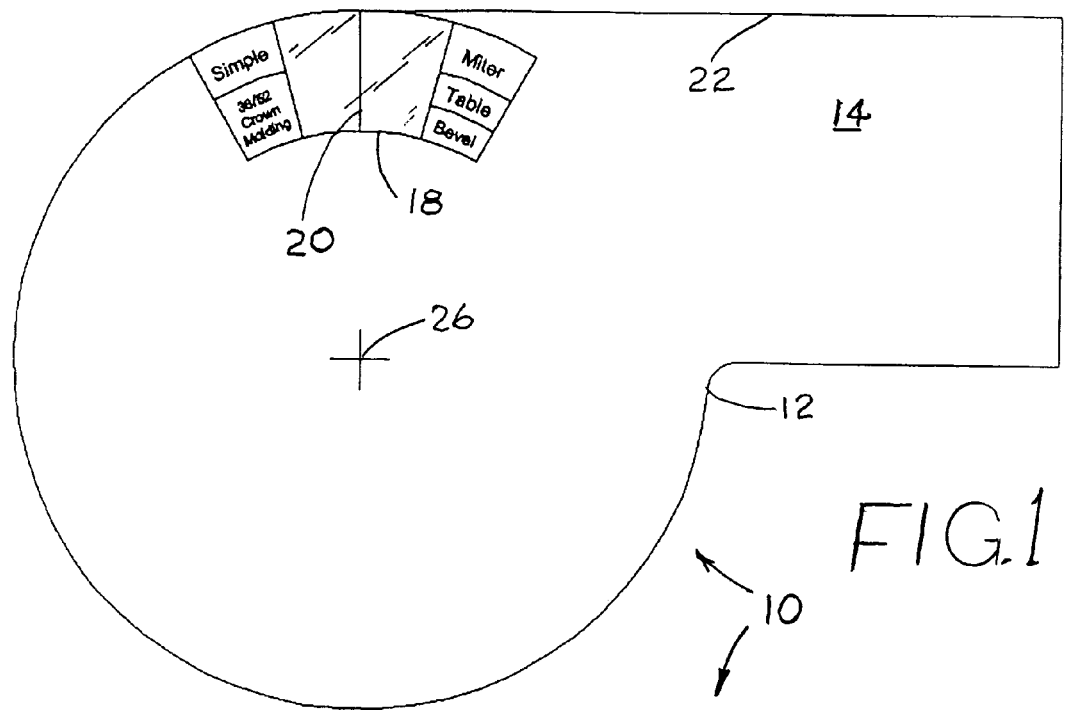
FIG. 1 shows a front view of a partly circular member of a preferred embodiment of the present inventions, showing the viewing window and saw selling indicator for a first crown molding spring angle.
Figure 2:
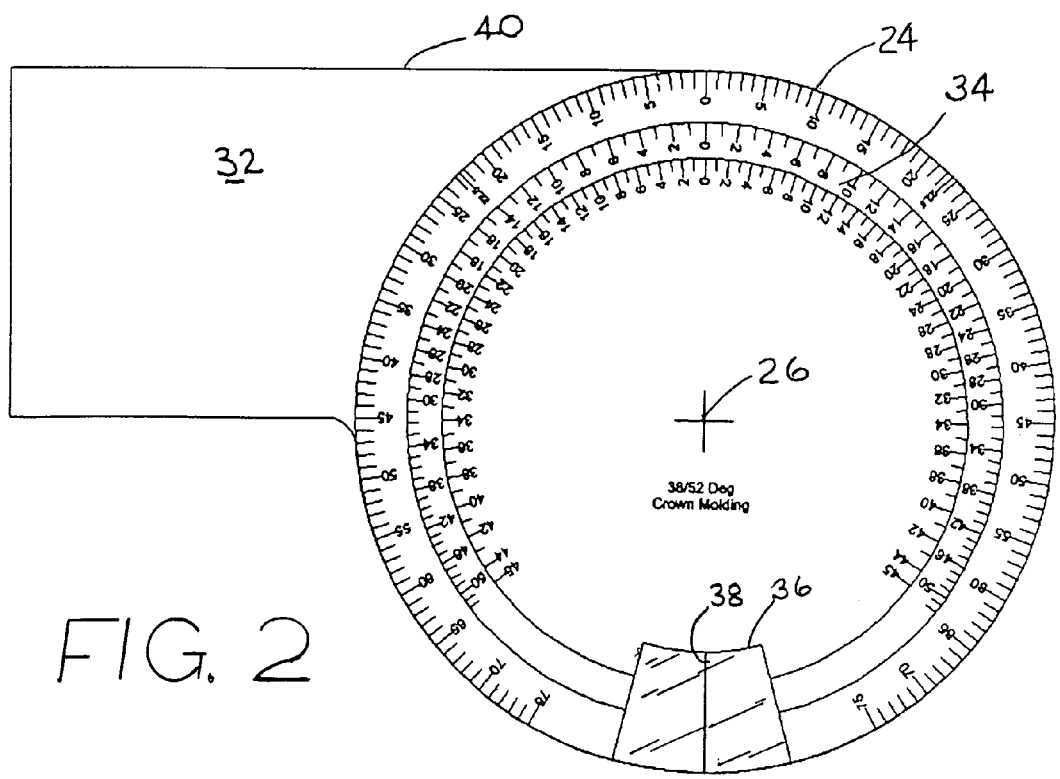
FIG. 2 shows the rear face of the opposed, partly circular member, with a flat system compound miter non-linear continuous circular scale viewed through the window of the partly circular member of FIG. 1.
Figure 3:
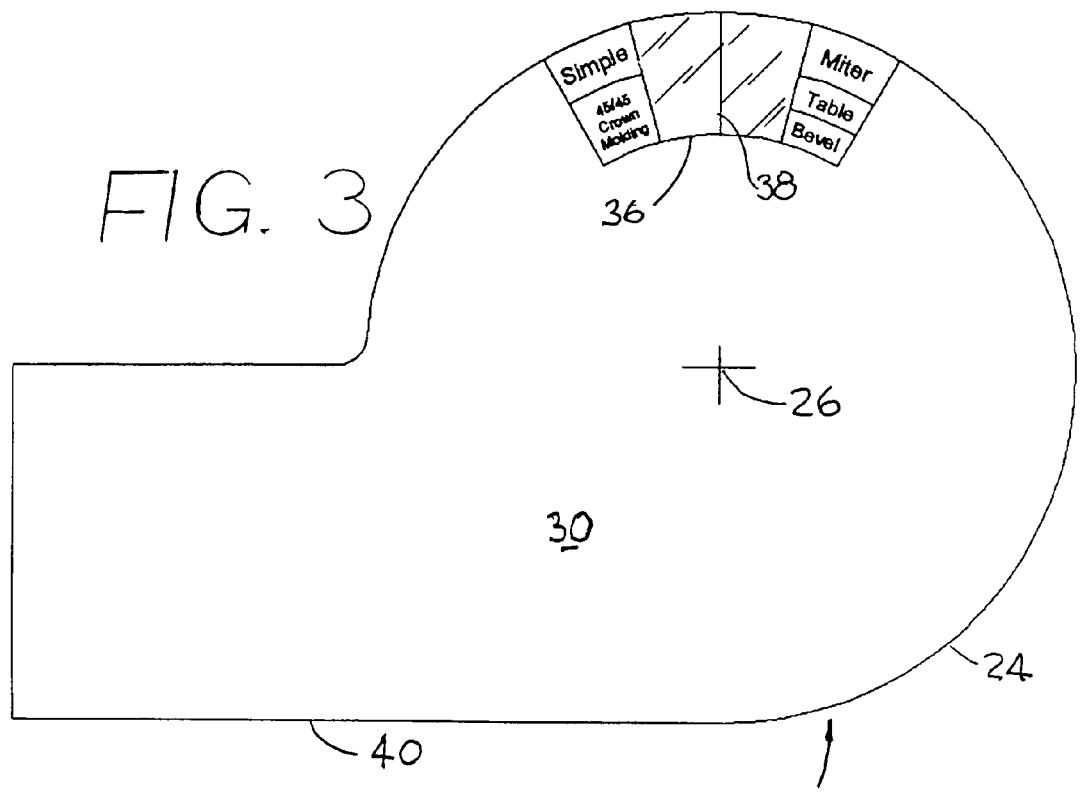
FIG. 3 shows a front view of the opposed partly circular member of the preferred embodiment of FIG. 1, showing the viewing window and saw selling indicator for a second flat system compound miter scale.
Figure 4:
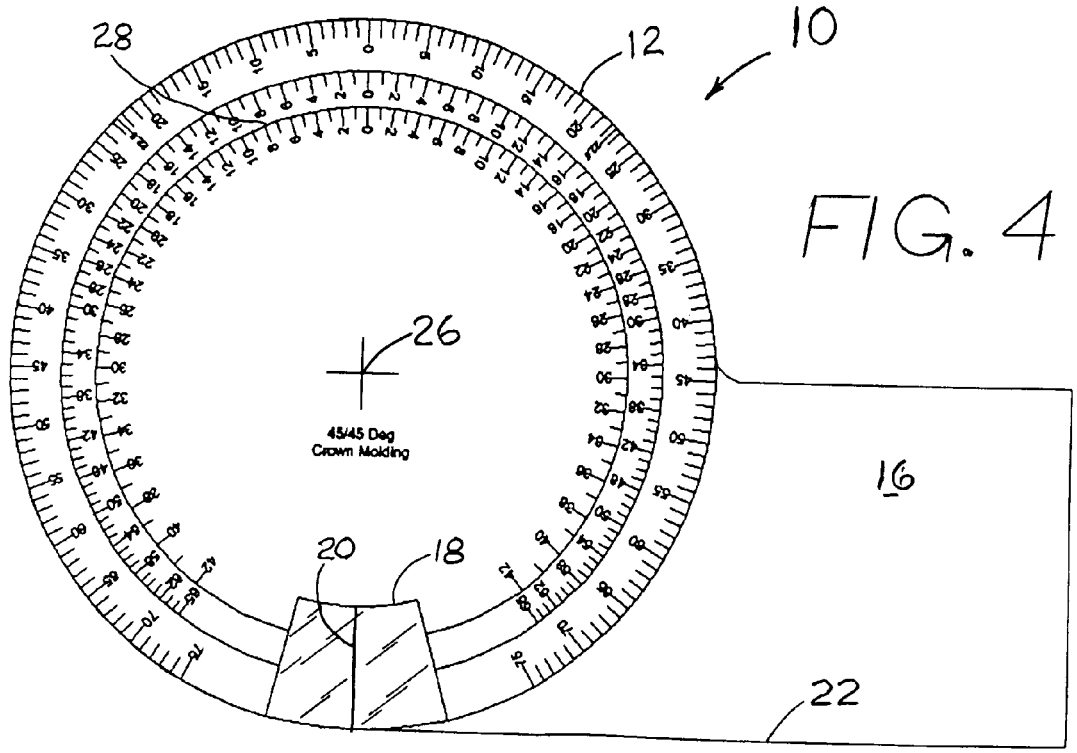
FIG. 4 shows the rear face of the partly circular member of FIG. 1, with the non-linear, continuous circular scale for the opposed partly circular member of FIG. 3.
Figures 5, 6:
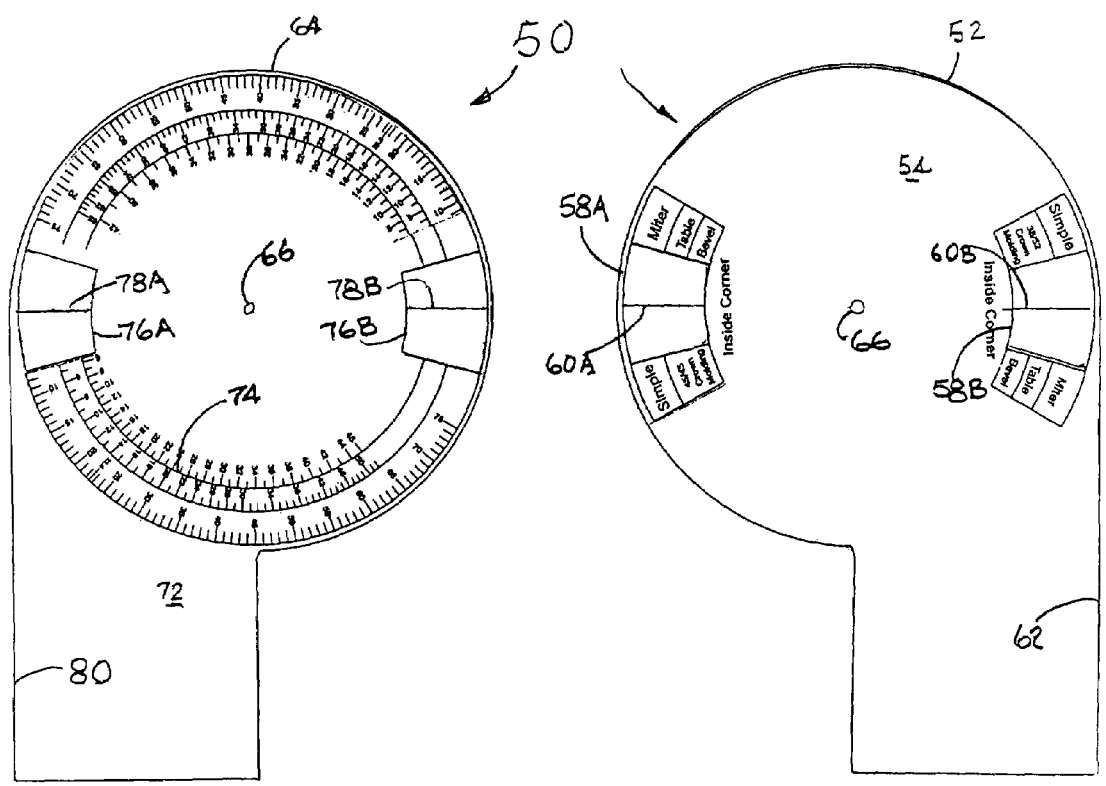
FIG. 5 shows the inside corner face of another embodiment of the present invention for determining compound miter saw table and bevel angle settings.
FIG. 6 shows a recreated circular scale of the present invention for inside corner miters of either 38/52 degree or 45/45 degree crown molding for the embodiment of FIG. 5.
Figures 7, 8:
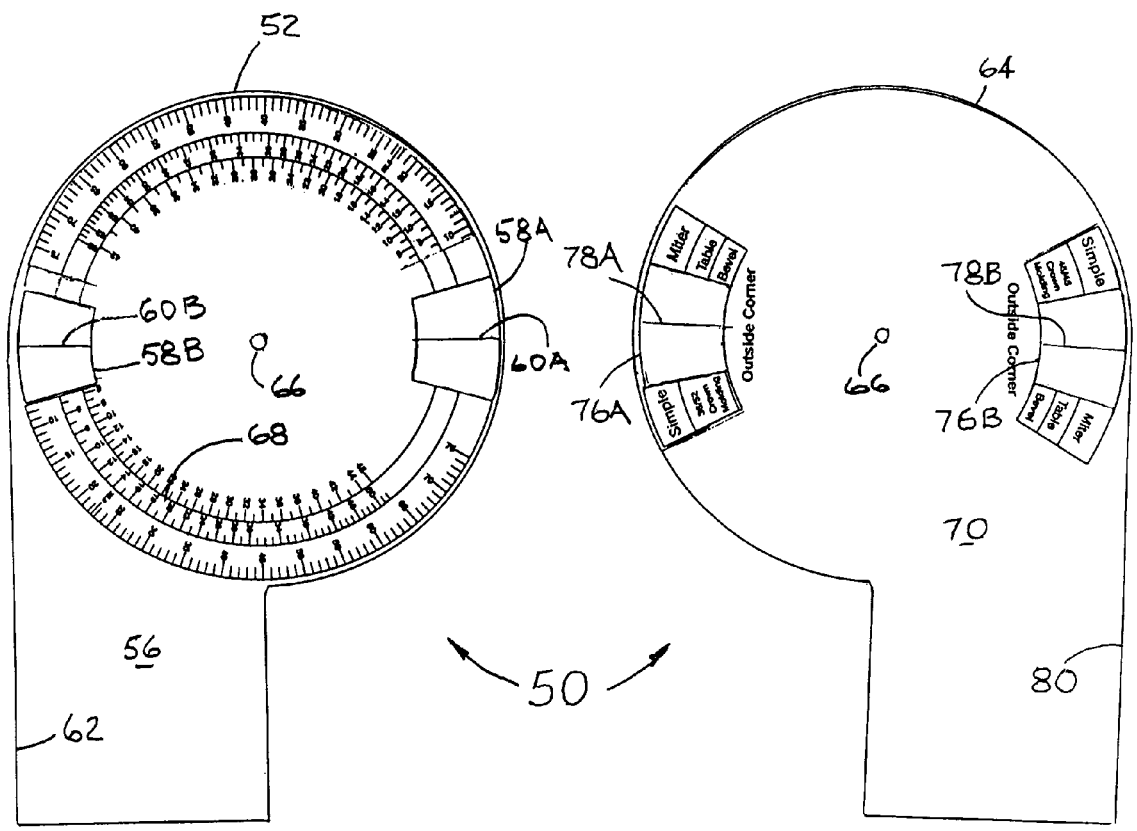
FIG. 7 shows the outside corner face of the embodiment of FIG. 5.
FIG. 8 shows a circular scale of the present invention for outside corner miters of either 38/52 degree or 45 degree crown molding for the embodiment of FIG. 5.

FIGS. 1-4 show a preferred embodiment 10 of the present inventions. Here, first partly circular member 12 of FIG. 1, having front face 14, rear face 16, viewing window 18, indicator 20 and tangentially extending straight edge portion 22, is pivotally connected to a similar, opposed member 24 at the common center 26. Second member 24 has front face 30 and rear face 32, viewing window 36, indicator 38 and tangentially extending straight edge portion 40. Straight edge 22 and 40 are oriented to extend in opposite directions and can be rotated to conform to any given wall corner angle.

Prior art Cartesian charts, available separately or in carpentry related handbooks, are recreated as continuous circular scales 28 and 34 and imprinted on rear faces 16 and 32 respectively. The scale values are settings of radial saw table and bevel angles used for flat system miter cutting of selected moldings, usually either 38/52 degree or 45 degree crown molding, but can also be used where needed for compound angles in gable roof rafters, or the like. Configured in the manner shown, straight edges 40 and 22 and indicators 20 and 38, which rotate with respect to scales 28 and 34 respectively, act as would the horizontal reference of a Cartesian chart.

The settings are viewed through window 18 or 36 in the opposed circular member where indicator 20 or 38 is located to align with the table and bevel angle values appropriate to the selected molding and corner angle. Windows may be made as simple openings and indicators may be made as formed point in the window edge. Members 12 and 24 are preferably made of a clear, tough plastic and silk screened on both faces as shown. Viewing windows 18 and 36 are left clear except for indicators 20 and 38, which are marked on rear faces 16 and 32 to eliminate parallax. In this manner, there is no requirement for transferring corner angle readings to a chart and no requirement for interpolation of values for intermediate corner angles.

Stand-up system saw table settings 42 may be added to the circular scales as simple miter values.

FIGS. 5-8 show an alternative embodiment 50 of the present inventions for the purpose of illustrating that the present inventions can be expressed in other ways within the spirit thereof. Here, a first partly circular member 52, having front face 54 and rear face 56, viewing windows 58A and 58B, indicators 60A & 60B and tangentially extending straight edge 62, for concentric pivotally connected to similar, opposed second member 64 at their common center 66. Second member 64 has front face 70 and rear face 72, viewing windows 76A & 76B, indicators 78A & B and tangentially extending straight edge 80. Straight edges 62 and 80 are oriented to extend in opposite directions and can be rotated to conform to a corner.

As in preferred embodiment 10 Cartesian charts of corner angles to saw table and bevel angles are recreated as non-linear, continuous circular scales 68 and 74 and imprinted on rear faces 56 and 72 respectively. Embodiment 50 is different from embodiment 10 in that half of circular scale 68 is devoted to showing outside corner settings for 38/52 degree crown moldings and the other half is devoted to showing outside corner settings for 45 degree crown molding. In a similar way, circular scale 74 shows inside corner settings for either a 38/52 degree or 45/45 degree crown molding.

The saw table and bevel settings as before, are viewed through the appropriate window 58A, 58B, 76A or 76B. Obviously, care must be exercised to use the proper window for the intended application and for this, embodiment 50 is not the preferred expression of the present invention.

Figure 9:
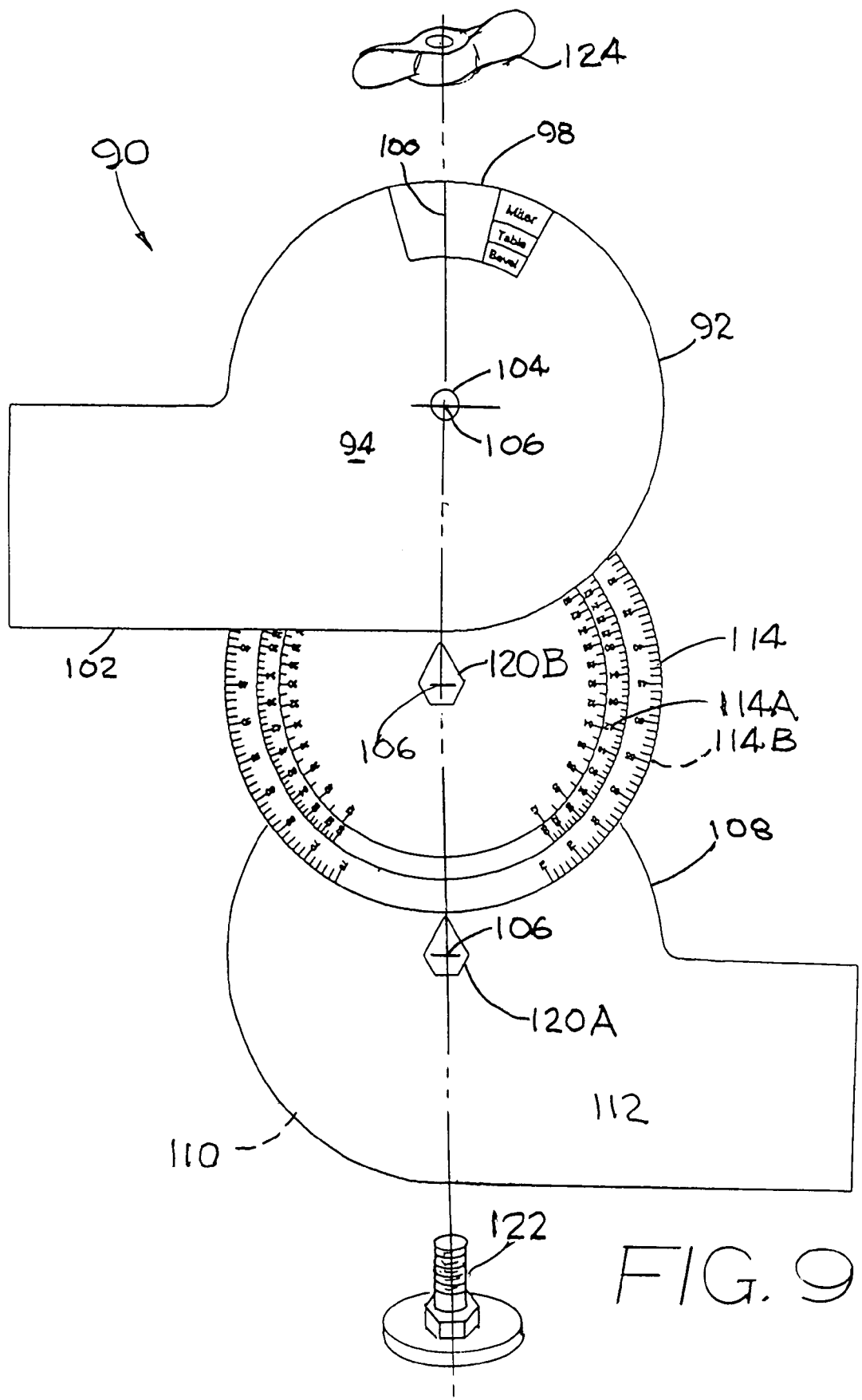
FIG. 9 shows an exploded assembly view of an alternative version of the preferred embodiment featuring a removable and interchangeable circular scale.

FIG. 9 shows an exploded assembly view of a second preferred embodiment 90 of the present inventions and the most desirable for prevention of inadvertent scale reference errors. Here as before, a first partly circular member 92, has front face 94 with a viewing window 98, an indicator 100, a tangentially extending straight edge 102 and a round hole 104 at common center 106. Connected thereto at common center 106 is a similar, opposed second member 108. Second member 108 has a "one-way" retaining hole 120A at common center 106 and both front face 110 and rear face 112 are blank Scales showing flat system miter settings, for selected applications, similar to the previous continuous circular scales 28 and 34, are imprinted on replaceable disk 114, one application on face 114A and one on face 114B. These applications may comprise 38/52 degree crown molding miters, 45/45 degree crown molding miters or other less common applications. "One-way"hole 120B, matches hole 120A in member 108 and assembly bolt 122 has a limited portion of its length made to fit the "one-way" shape of 120A and 120B, so that when engaged by wing nut 124, disk 114 is fixed with regard to opposed member 108. Embodiment 90 is used in the same way as embodiment 10 except that disk 114 is held in assembly to suit the desired application.

The embodiments shown and described above are exemplary. Even though many characteristics and advantages of the present inventions have been described in the drawings and accompanying text, the description is illustrative only. The restrictive description and drawings of these specific examples do not point out what an infringement of this patent would be, but are to provide at least one explanation of how to use and make the inventions. It is to be understood that the present invention is not limited to the disclosed embodiments but may be expressed through rearrangement or modification or substitution of parts, within the same spirit of invention. The scope of the inventions and the bounds of patent protection are set forth in the following claims.

We claim:

1. A compound angle miter gauge for 38/52 degree crown molding comprising:

a first partly circular member having front and rear faces, a centrally located pivotal connection and a tangentially extending first straight edge;

a second partly circular member having front and rear faces, connected, rear face to rear face, to the first partly circular member for pivotal movement about their common centers and having a second straight edge extending tangentially opposite to the first tangentially extending straight edge, so that the angle included between the first and second straight edges may be adjusted to match a given corner of a wall;

a window in the first partly circular member located proximate the periphery thereof;

38/52 degree crown molding flat system compound miter saw table angle and bevel angle settings for the given corner in a continuous, non-linear circular scale at the rear face of the second partly circular member, oriented with respect to the tangentially extending second straight edge and located to show through the window; and an indicator in the window to determine saw table and bevel angle settings for compound miter cutting 38/52 degree crown molding to fit the corner.

2. A compound angle miter gauge according to claim 1 wherein the circular scale is in the form of a removable disk, held in position relative to the second partly circular member.

3. A compound angle miter gauge for flat system miter cutting crown moldings comprising:

a first circular member having front and rear faces, a centrally located pivotal connection and a tangentially extending first straight edge;

a second circular member having front and rear faces, a centrally located pivotal connection for rear face to rear face connection to the first circular member and a second straight edge extending tangentially opposite to the first tangentially extending straight edge, so that the included angle between the first and second straight edges may be conformed to a given wall corner;

45/45 degree crown molding miter settings for saw table and bevel angle settings imprinted as a continuous, non-linear circular scale on the rear face of the first circular member;

38/52 degree crown molding miter settings for saw table and angle settings imprinted as a continuous circular scale on the rear face of the second circular member; and indicators visible from the front faces for determining saw table and bevel angle settings for flat system compound miter cutting either 45/45 degree or 38/52 degree crown molding to fit the wall corner.

4. A compound angle miter gauge according to claim 3 wherein the circular scale is in the form of a removable disk, held in position relative to the first or second circular member.

5. A method for determining radial saw settings for flat system compound miter cutting of crown moldings comprising the steps of:

creating a corner angles to saw table and bevel angle settings as a continuous, non-linear circular scale;

affixing the circular scale to a tangentially extending straight edge;

applying the straight edge to a wall at a side of a corner;

rotating a second straight edge about the center of the circular scale to contact the other side of the corner; and reading the radial saw table angle and bevel angle settings from the circular scale by an indicator fixed relative to the second straight edge.

6. A compound angle miter gauge for 45/45 degree crown molding comprising:

a first partly circular member having front and rear faces, a centrally located pivotal connection and a tangentially extending first straight edge;

a second partly circular member having front and rear faces, connected, rear face to rear face, to the first partly circular member, for pivotal movement about their common centers and having a second straight edge extending tangentially opposite to the first tangentially extending straight edge, so that the angle included between the first and second straight edges may be adjusted to match a given wall corner;

a window in the first partly circular member located proximate the periphery thereof;

45/45 degree crown molding flat system compound miter settings for saw table angle and bevel angle settings for the given corner in a continuous, non-linear circular scale at the rear face of the second partly circular member, oriented with respect to the tangentially extending second straight edge and located to show through the window; and an indicator in the window to determine saw table and bevel angle settings for cutting a compound miter of 45/45 degree crown molding to fit the given wall corner.

7. A compound angle miter gauge according to claim 6 wherein the circular scale is in the form of a removable disk, held in position relative to the second partly circular member.

* * * * *